(12) United States Patent
DeLuca

(10) Patent No.: US 7,025,281 B2
(45) Date of Patent: Apr. 11, 2006

(54) PROGRAMMABLE THERMOSTAT INCORPORATING AIR QUALITY PROTECTION

(75) Inventor: Michael R. DeLuca, Mt. Laurel, NJ (US)

(73) Assignee: Lux Products Corporation, NJ (US)

( * ) Notice: Subject to any disclaimer, the term of this patent is extended or adjusted under 35 U.S.C. 154(b) by 0 days.

(21) Appl. No.: 10/991,190

(22) Filed: Nov. 17, 2004

(65) Prior Publication Data

US 2005/0087617 A1 Apr. 28, 2005

Related U.S. Application Data

(62) Division of application No. 10/657,461, filed on Sep. 8, 2003.

(60) Provisional application No. 60/467,942, filed on May 5, 2003.

(51) Int. Cl.
*G05D 23/00* (2006.01)
*F24F 7/00* (2006.01)
*F25D 23/12* (2006.01)

(52) U.S. Cl. .......... 236/24; 236/49.3; 62/129; 62/331

(58) Field of Classification Search ........... 236/94, 236/49.3; 62/129, 331; 165/11.1
See application file for complete search history.

(56) References Cited

U.S. PATENT DOCUMENTS

| 2,495,861 A | 1/1950 | Newton |
| 2,882,383 A | 4/1959 | Boyd, Jr. et al. |
| 3,454,078 A | 7/1969 | Elwart |
| 3,635,044 A | 1/1972 | Heth |
| 3,948,438 A | 4/1976 | Vlasak |
| 4,011,735 A | 3/1977 | Martz et al. |
| 4,075,864 A | 2/1978 | Schrader |
| 4,136,822 A | 1/1979 | Felter |
| 4,167,966 A | 9/1979 | Freeman |
| 4,267,967 A | 5/1981 | Beck et al. |
| 4,352,349 A * | 10/1982 | Yoho ............ 126/299 R |
| 4,356,962 A | 11/1982 | Levine |
| 4,369,916 A | 1/1983 | Abbey |
| 4,408,711 A | 10/1983 | Levine |
| 4,449,375 A | 5/1984 | Briccetti |
| 4,452,391 A | 6/1984 | Chow |

(Continued)

FOREIGN PATENT DOCUMENTS

JP 61-8544 1/1986

OTHER PUBLICATIONS

AirCycler™ STAT & combo STAT(www.AirCycler.com) Brochure.

(Continued)

*Primary Examiner*—Marc Norman
(74) *Attorney, Agent, or Firm*—DLA Piper Rudnick Gray Cary US LLP

(57) ABSTRACT

The invention is directed to programmable temperature control in which a controller may be programmed to control a thermal output of said temperature-modifying device, and to operate an air circulating system independently of the temperature-modifying device. The apparatus may incorporate a user input for entering air handling information to program the air circulating system to operate at predetermined intervals. The controller may be further programmed to receive air filtration information from the user input and to generate air filtration output information. The system may also be programmed to receive information regarding a characteristic of the air circulating system from an sensor for use in calculating the air filtration output information.

46 Claims, 11 Drawing Sheets

U.S. PATENT DOCUMENTS

| | | |
|---|---|---|
| 4,467,617 A | 8/1984 | Morgan, Jr. et al. |
| 4,502,625 A | 3/1985 | Mueller |
| 4,567,939 A | 2/1986 | Dumbeck |
| 4,595,139 A | 6/1986 | Levine |
| 4,625,633 A | 12/1986 | Martin |
| 4,684,060 A | 8/1987 | Adams et al. |
| 4,718,021 A | 1/1988 | Timblin |
| 4,773,587 A | 9/1988 | Lipman |
| 4,838,482 A | 6/1989 | Vogelzang |
| 4,930,460 A | 6/1990 | Aihara et al. |
| 4,941,325 A | 7/1990 | Nuding |
| 4,951,473 A | 8/1990 | Levine et al. |
| 5,020,332 A | 6/1991 | Nakatsuno et al. |
| 5,107,918 A | 4/1992 | McFarlane et al. |
| 5,131,236 A | 7/1992 | Wruck et al. |
| 5,142,880 A | 9/1992 | Bellis |
| 5,179,524 A | 1/1993 | Parker et al. |
| 5,215,498 A | 6/1993 | Wong et al. |
| 5,239,834 A | 8/1993 | Travers |
| 5,241,253 A | 8/1993 | Schlangen |
| 5,257,736 A | 11/1993 | Roy |
| 5,289,362 A | 2/1994 | Liebel et al. |
| 5,325,286 A | 6/1994 | Weng et al. |
| 5,544,809 A | 8/1996 | Keating et al. |
| 5,547,017 A | 8/1996 | Rudd |
| 5,676,196 A | 10/1997 | Jakubzick et al. |
| 5,718,372 A | 2/1998 | Tishler |
| 5,850,968 A | 12/1998 | Jokinen |
| 5,881,806 A | 3/1999 | Rudd |
| 6,095,426 A | 8/2000 | Ahmed et al. |
| 6,318,639 B1 | 11/2001 | Toth |
| 6,715,302 B1 * | 4/2004 | Ferragut, II .................. 62/129 |
| 6,779,735 B1 | 8/2004 | Onstott |
| 2004/0245352 A1 * | 12/2004 | Smith .......................... 236/94 |

OTHER PUBLICATIONS

Advanced Controls: AirCycler Model FR Brochure.
Air Cycler™ (www.AirCycler.com) Brochure.
Advanced Controls: AirCycler Model FR-V Brochure.
AirCycler, the indoor air quality solution (www.aircycler.com) Brochure.
AirCycler STAT & combo STAT Brochure.
AirCycler® (www.AirCycler.com) Brochure.

* cited by examiner

PROGRAMMABLE THERMOSTAT INCORPORATING AIR QUALITY PROTECTION

CROSS-REFERENCE TO RELATED APPLICATIONS

This application is a divisional of application Ser. No. 10/657,461, filed Sep. 8, 2003 and claims the priority of U.S. Provisional Patent Application Ser. No. 60/467,942 filed on May 5, 2003, which is herein incorporated in its entirety by reference.

FIELD OF THE INVENTION

The field of the invention is that of programmable thermostats for controlling a heating and/or cooling system to maintain predetermined set point temperatures, and more particularly to programmable thermostats that incorporate air quality protection features.

BACKGROUND OF THE INVENTION

It has been a longstanding problem in the heating and cooling of homes and offices to efficiently regulate the ambient temperature to maintain the desired comfort level, while minimizing the amount of energy expended by the heating/cooling apparatus. The heating/cooling needs of a home or office are not constant over time and may, in fact, vary substantially depending on the time of day or day of the week. Conventional thermostats have been highly inefficient in this regard due to the fact that only one set temperature could be maintained.

In response to this, programmable thermostats were developed in the prior art that allowed for the programming of set points for the thermostat based upon the time of day or day of the week. These programmable thermostats utilize a microprocessor into which the user inputs the desired temperature setting information by way of a keypad or some other arrangement of buttons and switches.

Air handling systems for use in temperature control, such as in residential or commercial heating ventilation and air conditioning ("HVAC") systems, typically utilize an air filtration system, typically incorporating a furnace or air conditioning filter, to collect airborne particles that may be circulating in the system. The use of a filtration system helps to reduce the build up of allergens (such as pollen, mold, spores, dander, etc.) and other material within the ductwork that circulates air through the system, and helps to remove these particulates from the air. The presence of such material may greatly reduce the efficiency of the temperature control system itself, in addition to posing health risks to those inhabiting the environmentally controlled space. Maintaining the efficiency of the filter through proper changing or cleaning of the filter is particularly important in some systems, such as those incorporating the use of heat pumps.

In the past, some programmable thermostats have included a filter counter that works in background while the thermostat is in operation. When the designated usage period for the filter has elapsed, a "FILTER" message then appears on the thermostat display. No information about the filter usage is available to the user during normal operation of the thermostat. Instead, the user must switch the thermostat to a filter mode for setting or resetting the filter usage period (typically from 0 to 500 hours) and viewing the time remaining in the filter usage period.

Moreover, the amount of allergens and other particulates present in the ductwork for the air circulating system may be reduced by operating the fan that circulates the air on a regular basis. Operating the fan at independent regular intervals (as opposed to continuously or only when then the furnace or cooling system are operating) can more effectively clean the air used in the system, while also conserving energy usage and extending the life of the air handling unit. However, this is not done in the systems of the prior art.

Accordingly, a temperature control system is needed that further enhances the cleaning of air circulating through an environmental control system.

SUMMARY OF THE INVENTION

Embodiments of the invention may include a system for programmable temperature control in which a controller may be programmed to control a thermal output of said temperature-modifying device, and to operate an air circulating system independently of the temperature-modifying device. The apparatus may incorporate a user-operable input for entering air handling information to program the air circulating system to operate at predetermined intervals. The air handling information may include one or more operating periods and/or ON time for the air circulating system during the operating periods.

The controller may be further programmed to receive air filtration information from the user-operable input and to generate air filtration output information displayed during the control of the thermal output of the temperature-modifying device. The filter output information may comprise how much time remains in a air filter usage period, what percentage of the air filter usage period remains, and/or whether the air filter should be checked.

The system may also be programmed to receive information regarding a characteristic of the air circulating system from an sensor for use in calculating the air filtration output information. The characteristic may comprises, for example, one or more selected from the group consisting of air pressure, air flow, air heat loss, fan usage, fan current draw, and fan power usage.

BRIEF DESCRIPTION OF THE DRAWINGS

The foregoing and other aspects and advantages will be better understood from the following detailed description of the invention with reference to the drawings, in which.

DETAIL DESCRIPTION

The invention will be understood more fully from the detailed description given below and from the accompanying drawings of the preferred embodiments of the invention; which, however, should not be taken to limit the invention to a specific embodiment, but are for explanation and understanding only.

Figure 1:
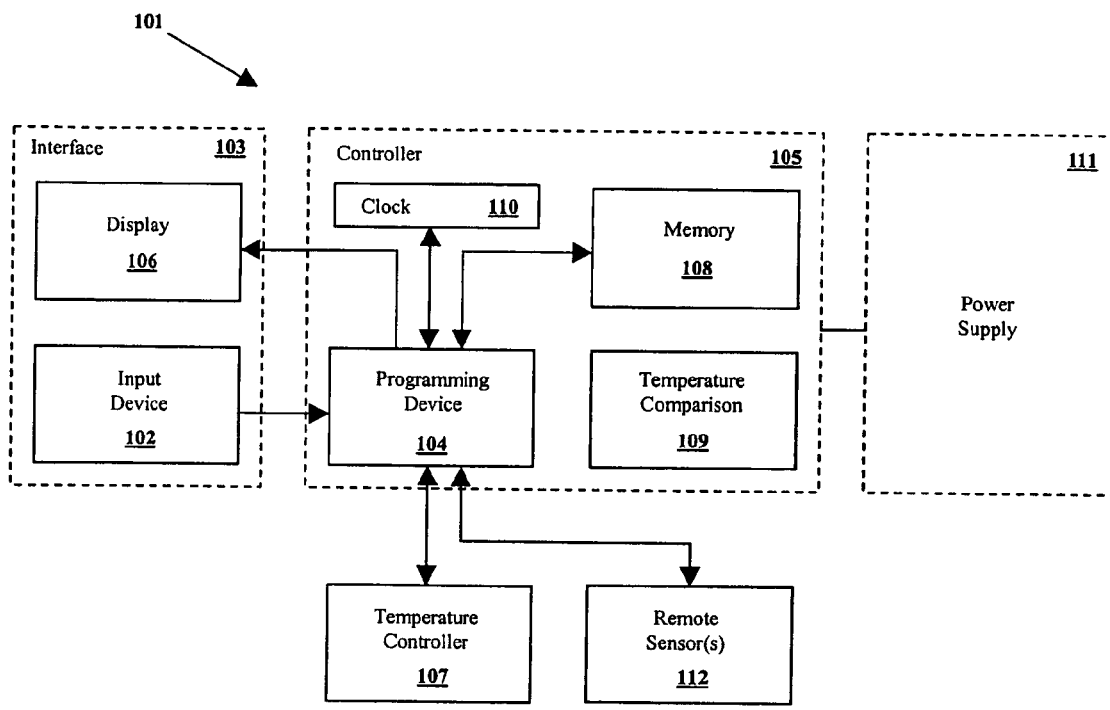
FIG. 1 is a block diagram of a programmable thermostat.

FIG. 1 contains a block diagram of an embodiment of a programmable thermostat. Those of ordinary skill in the art will appreciate that the invention is not limited thereto and may comprise any device or configuration of components capable of operating in the manner of the invention. In the embodiment disclosed herein, information regarding the desired set point temperature, date, or time for each program may be inputted to thermostat 101 by the user through input device 102 in interface 103. Interface 103 may be connected to a programming device 104 of controller 105 in such a way that programming device 104 receives information inputted at input device 102, and may display this information on display device 106.

Programming device 104 may also control the operation of a temperature-modifying device 107, which is typically a heating/cooling system for the medium whose temperature is being controlled, such as HVAC systems, geothermal systems, gas, natural gas, or electric furnaces or water heaters, etc. Programmable device 104 may store the information received from input device 102 in memory 108, along with an algorithm or program for operating temperature-modifying device 107 in accordance with this information.

Programming device 104 may comprise any device capable of operating in the manner of the invention, such as a logic circuit on a logic board, a microprocessor, or other integrated circuit. Similarly, memory 108 may comprise electronic memory, such as RAM, SRAM, or DRAM, and the like, in an integrated circuit, such as a PROM, EPROM, or EEPROM and the like. Memory 108 may also form part of programming device 104. Display device 106 is also not particularly limited and may comprise, for example, an electronic display, such as an LCD, LED, and the like. Input device 102 may include pressure sensitive buttons, keypads, or any other device or arrangement of devices that are capable of entering the appropriate information. The operation of such devices is well known to those of ordinary skill in the art.

A comparison device 109 may be used to compare ambient temperature of the medium to be controlled with the desired control temperature, as determined by programming device 104 and stored in memory 108. Comparison device 109 may detect the current ambient temperature by using a conventional temperature-sensing device, such as a thermistor, thermocouple, or other type of temperature transducer.

A clock 110 may be connected with programming device 104 in order to provide time related information thereto for use in connection with the operation of programming device 104 and its program of temperature control. Time related information from clock 110 may also be stored in memory 108 and shown on display 106. Clock 110 may comprise any device for providing time related information, such as a voltage controlled oscillator (VCO), crystal oscillator, and the like, along with associated circuitry. The time related information provided by clock 110 is not limited and may comprise, for example, chronological time information, such as year, month, day, hour, minutes, and/or seconds, or synchronization information for programming device 104 (which may be used to calculate this information). Clock 110 may also form a part of programming device 104.

One or more remote sensors 112 may be used in communication with controller 105 such as to provide feedback information to programming device 104. For example, sensors may be used about the air filter to detect air pressure, air flow, or heat loss. In another example, sensors may also be used to detect fan operation, such as by detecting fan current draw. Information may be transmitted to and from the sensor using any number of mechanisms, such as wireless systems (e.g., radio frequency or infrared), low voltage communication cabling, or even using household wiring. The invention is not limited in this regard. The use of such sensors is discussed in more detail below in regard to monitoring fan and filter usage.

The operation of controller 105 and/or interface 103 may be powered by power supply 111. Power supply 111 is not particularly limited, but may comprise any source of power capable of operating controller 105 and interface 103, such as household current (e.g., 120v AC at 60 Hz), or one or more batteries (e.g., 9v DC).

Figure 2:
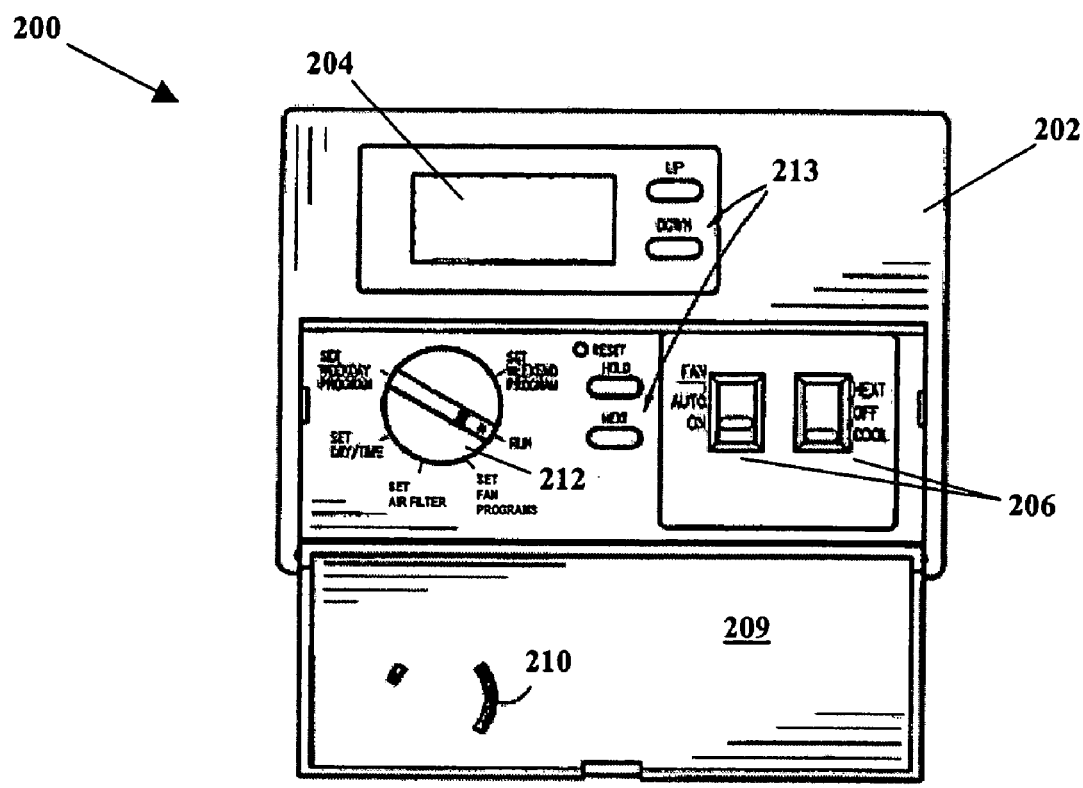
FIG. 2 is a front elevation of a programmable thermostat.

FIG. 2 illustrates an example of a programmable thermostat. As shown in FIG. 2, thermostat 200 may include an outer casing 202 to house the aforementioned components. Display window 204 may be used for housing display 106 (FIG. 1) for interaction with the user. Switches 206 may be used for switching between heating and cooling modes, or for switching an air handling fan from automatic mode to a constant "on" mode. Buttons 213 may further be used for inputting information into the thermostat, with information being presented through display window 204. Switches 206 and buttons 213 may be in communication with input device 102 (FIG. 1) for inputting information into the programmable thermostat. Of course, these aspects of pro-grammable thermostats temperature control are well known in the art and will not be further elaborated upon here.

Thermostat 200 may also include rotary dial 212, or some other mechanism, for switching between operation modes of the thermostat, such as the setting of the day and time, setting weekday and weekend functions, setting the filter, and running, and may also be in communication with input device 102. Of course, those of ordinary skill in the art will appreciate that it is not necessary to use a rotary dial and that any other mechanism, such as a combination of switches and buttons may be used to achieve the functionality described herein.

As previously noted, air handling systems for use in temperature control, such as in residential or commercial HVAC systems, typically utilize one or more filters, such as High Efficiency Particulate Air (or "HEPA") filter, electrostatic filters, etc., for collecting airborne particulates that may be circulating in the system. These filters typically comprise a tight web or fine mesh of material that is placed within an air register or ductwork through which air is passed by the air handling fan, or blower. As the air is passed through the filter, airborne particles are trapped with the fibers of the filter weave. Such filter systems are highly beneficial in reducing the spread of allergens, such as pollen, mold, spores, dander, etc. throughout a home or office.

However if an air handling system is not properly maintained, the efficiency of the temperature control system may be greatly reduced, reducing its ability to adequately clean the circulated air. For example, a filter that is not changed or cleaned regularly may become clogged from a build up of particulate matter, reducing airflow through the system and increasing the amount of allergens within the ductwork. These additional allergens may consequently be circulated through the system even once a filter is replaced. Also, reduced or inconsistent airflow may allow allergens to collect in the system ductwork.

In order to further enhance the cleaning of air circulating through the system, the thermostat may be programmed to operating the air handler in a cleaning cycle, which circulates air through the system at determined intervals to prevent the buildup and growth of allergens within the ductwork of the temperature control system.

In one embodiment, an air clean time control program may be operating as part of programming device 104. To set user-definable parameters for the program, the user may rotate the dial (or equivalent) to the SET FAN PROGRAMS position. FAN slide switch (206) may be set to the FAN CLEAN position and MODE slide switch (206) may be set to the HEAT or COOL positions.

In one embodiment, the air clean time control program may incorporate one or more default program periods, during which the fan may be operated for a set duration, such as 15 minutes of ON time per each hour. Thus, for example, each day may have one or more periods during which the fan is turned on for a set amount of time to circulate air through the system and help prevent the buildup and growth of allergens—regardless of the operation of the temperature modifying device itself. Several examples of such periods are listed in Table 1 below.

TABLE 1

| Default PERIODS | Monday Through Sunday START TIME |
|---|---|
| MORN | 6:00 AM (6:00) |
| DAY | 8.00 AM (8:00) |
| EVE | 6:00 PM (18:00) |
| NIGHT | 10:00 PM (22:00) |

While the manner of programming of the air cleaning cycles is not particularly limited, in one embodiment, programming may be performed in the following order: Mon Morn Start Time, Mon Morn Minimum ON Time, Mon Day Start Time, Mon Day Minimum ON Time, and so on until Sun Night is fully programmed. At this point, pressing again may begin the list at Mon Morn Start Time. During the programming process, information may be displayed on display 106 for the user. For example, "PROGRAM", "FAN", "START AT" icons may go solid along with appropriate "MO" (Monday) day and "MORN" period icons. The current period of start time being programmed may flash in the time section.

To change a default setting, a user may press and release the [UP] button to increment time in intervals, e.g., 15 minutes. The user could also press and release [DOWN] button to decrements time intervals. Alternatively, the user may press and hold the [UP] or the [DOWN] button to change the time at a preset rate, such as 60 minutes/second.

The user may press and release the [NEXT] button to advance to set minimum fan ON time (e.g., in hours). On display 106, the "PROGRAM" and "FAN" icons may go solid along with the appropriate "MO" day and "MORN" period to indicate the change to the user. The current set minimum time may flash with an icon such as "MIN/HR". The user may then adjust the value of minimum on time per hour (in minutes or seconds, for example).

In one embodiment, the value may be changed from 9 minutes to 60 minutes in increments of 3 minutes. The user may then press and release the [UP] or the [DOWN] button to alter the minimum ON Time setting by 3 minutes. The user may press [NEXT] to go to the next program period, and after all 4 programs period of a day have been programmed, pressing next may go to the next day "MORN".

The user may also copy programs of previous day into the current day and then advance to the next day's Morning program. For example, the user may copy the Friday's Morning program setting to Saturday's Morning program setting. When the user is finished programming the air cleaning program cycle, they may rotate the dial (or equivalent) away from the SET FAN PROGRAMS position.

A filter counter may also be used in the invention to help ensure proper maintenance of the system filters. In one embodiment of the invention, a filter counter may be programmed into programming device 104 utilizing clock 110 and display 106. In one embodiment, the filter counter may comprise a three-digit counter, which may count from 000 to 999 days for example. The period of the count may be set by the user, as described in more detail below. The filter counter may increment, for example, by one day at 12:00 midnight each day. The filter counter may even include a default period, such as 90 days, although the invention is not limited thereto.

FIGS. 3(a)–(d) incorporate samples of display 106 (FIG. 1) that illustrate the operation of a filter counter in accordance with the invention. As illustrated in FIGS. 3(a)–(d), in run mode, display 106 may show the number of days left before the filter needs to be changed at numerical indicator 302. The amount of the filter period spent may also be graphically illustrated, such as with bar indicator 304. Indicator 306 shows the user that the filter counter is in operation. A CURRENT TIME/TEMPERATURE section 308 may display current time and/or temperature information. A PROGRAM section 310 and TEMP section 312 may also be included, which show the currently operating program information and set point temperature.

Figure 3A:
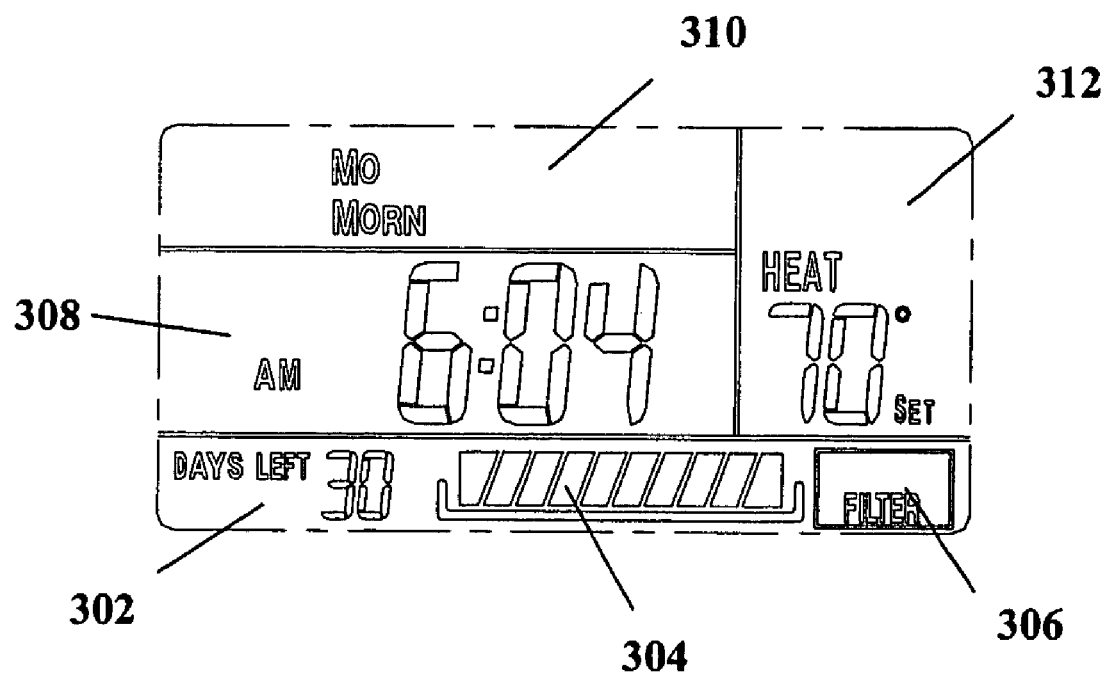
FIGS. 3(a)–(d) are illustrations of a programmable thermostat display.
Figure 3B:
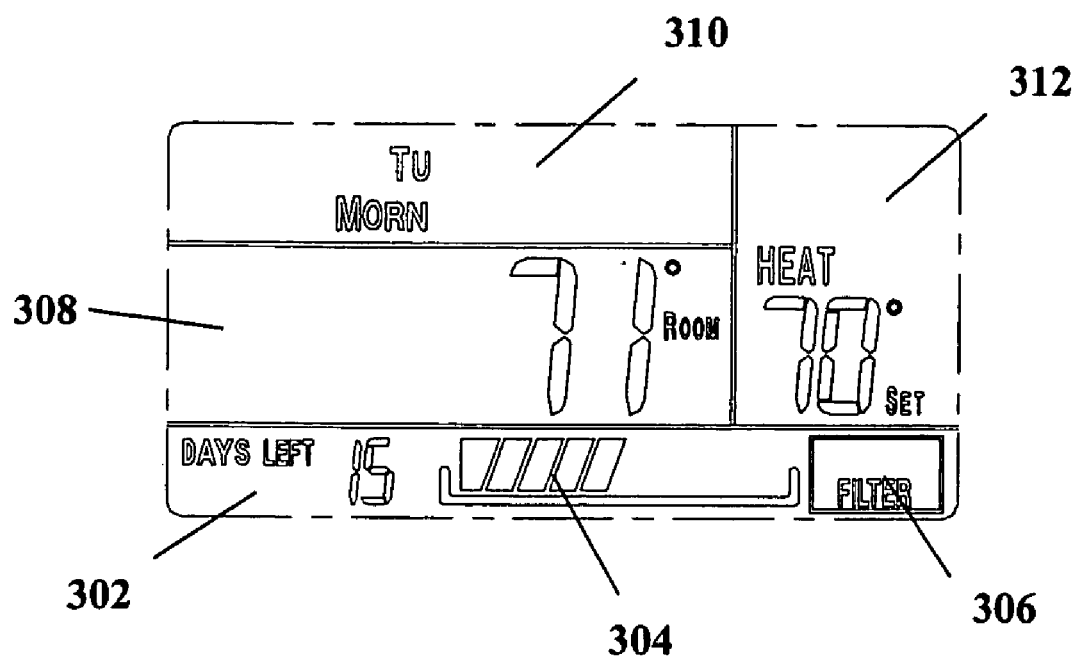
Figure 3C:
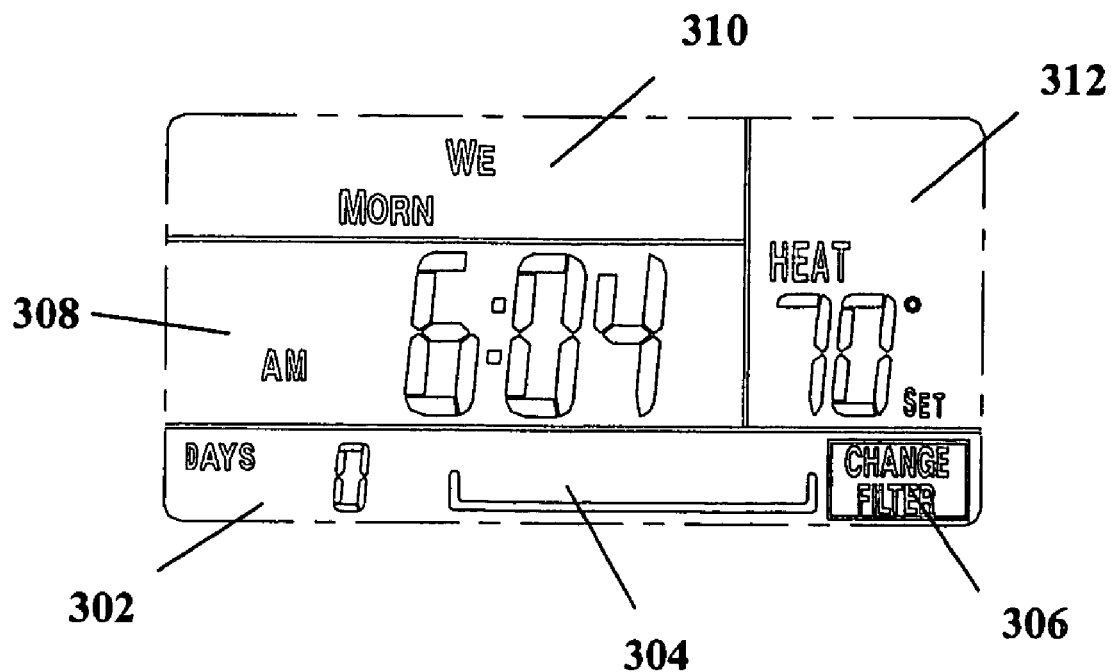

As shown in FIG. 3(a), the filter usage may start at 100% on bar indicator 304. In this example, the filter usage has been set to thirty days, as indicated by numerical indicator 302. As the counter counts down, the number of days maybe decremented on numerical indicator 302, as shown in FIG. 3(b). Bar indicator 304 may likewise indicate the percentage of filter life remaining. When the filter counter has decremented to zero (indicating the end of the set filter period), Indicator 306 may now flash a "change filter" message, which demonstrates to the user that the filter should be changed or cleaned.

Figure 3D:
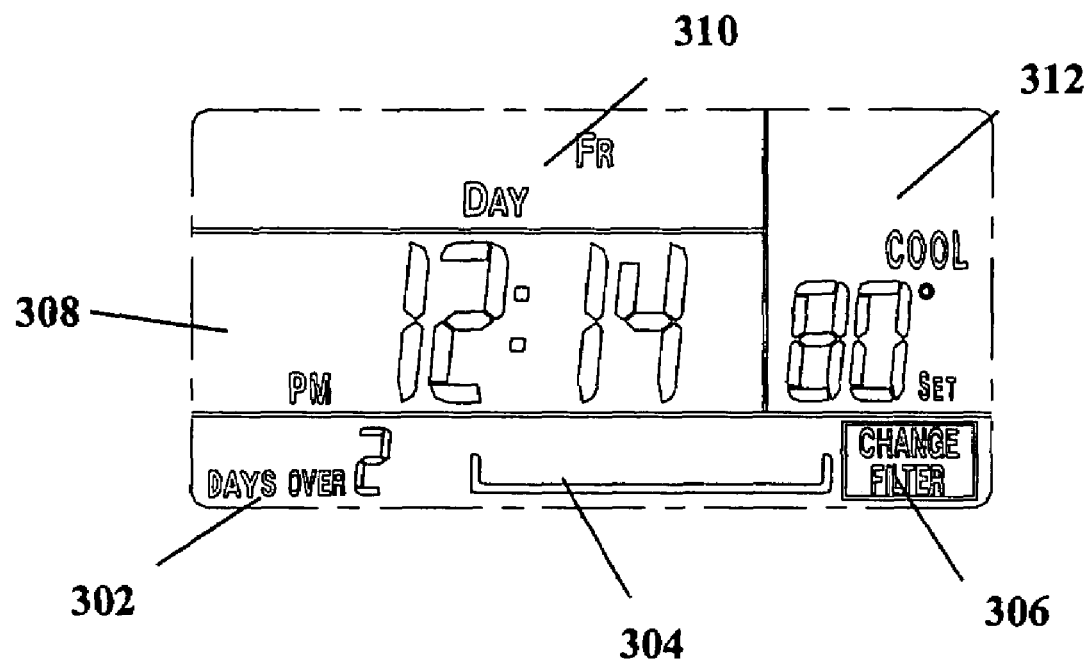

In one embodiment, the filter counter may continue to count beyond the end of the filter usage period. One example of this is illustrated in FIG. 3(d). Numerical indicated 302 may now increment the number days that have elapsed since the end of the filter usage period (e.g., "DAYS OVER"). Indicator 306 may also continue to flash the "CHANGE FILTER" message.

Figure 4A:
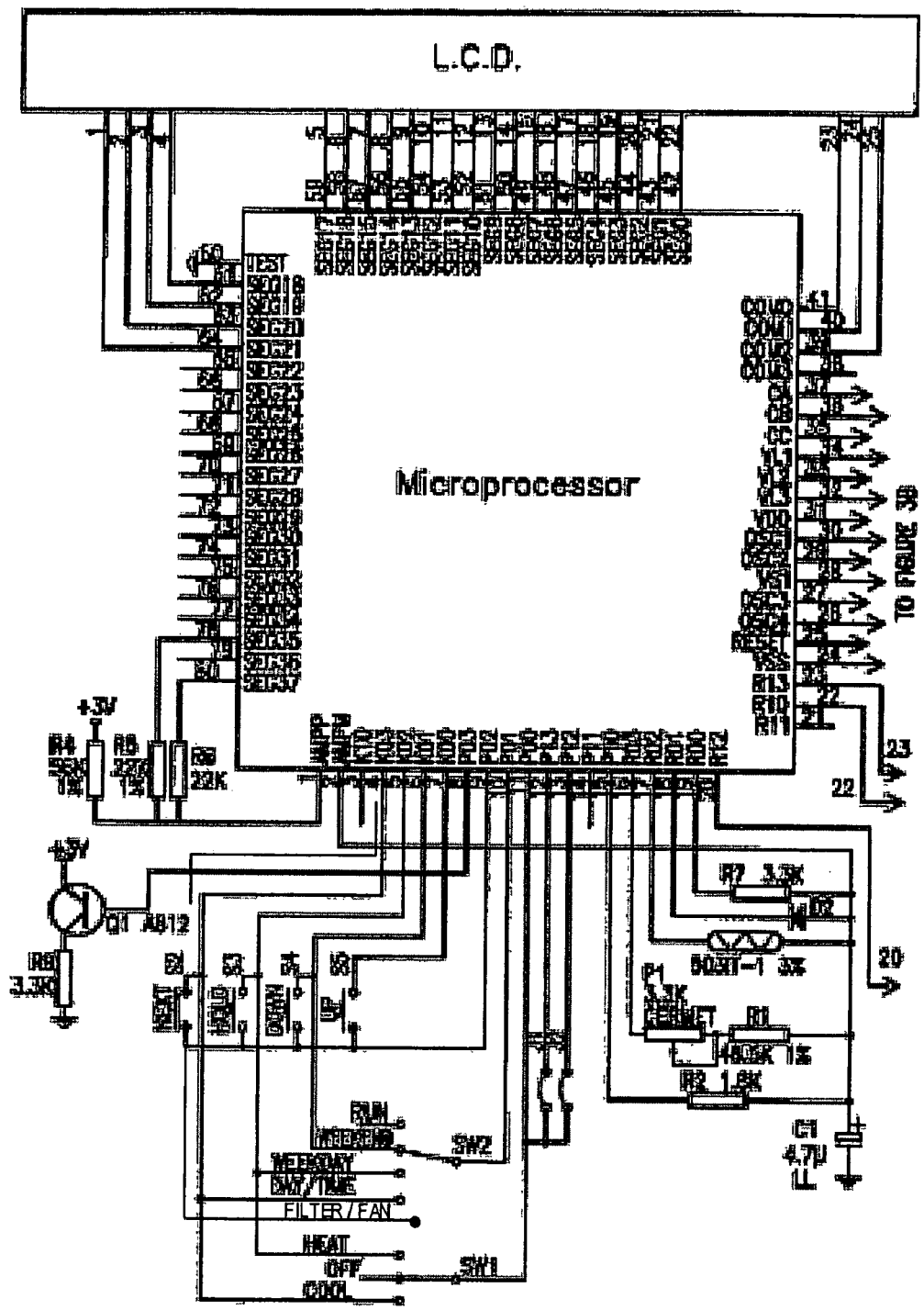
FIGS. 4(a)–(b) are a schematic of a programmable thermostat.
Figure 4B:
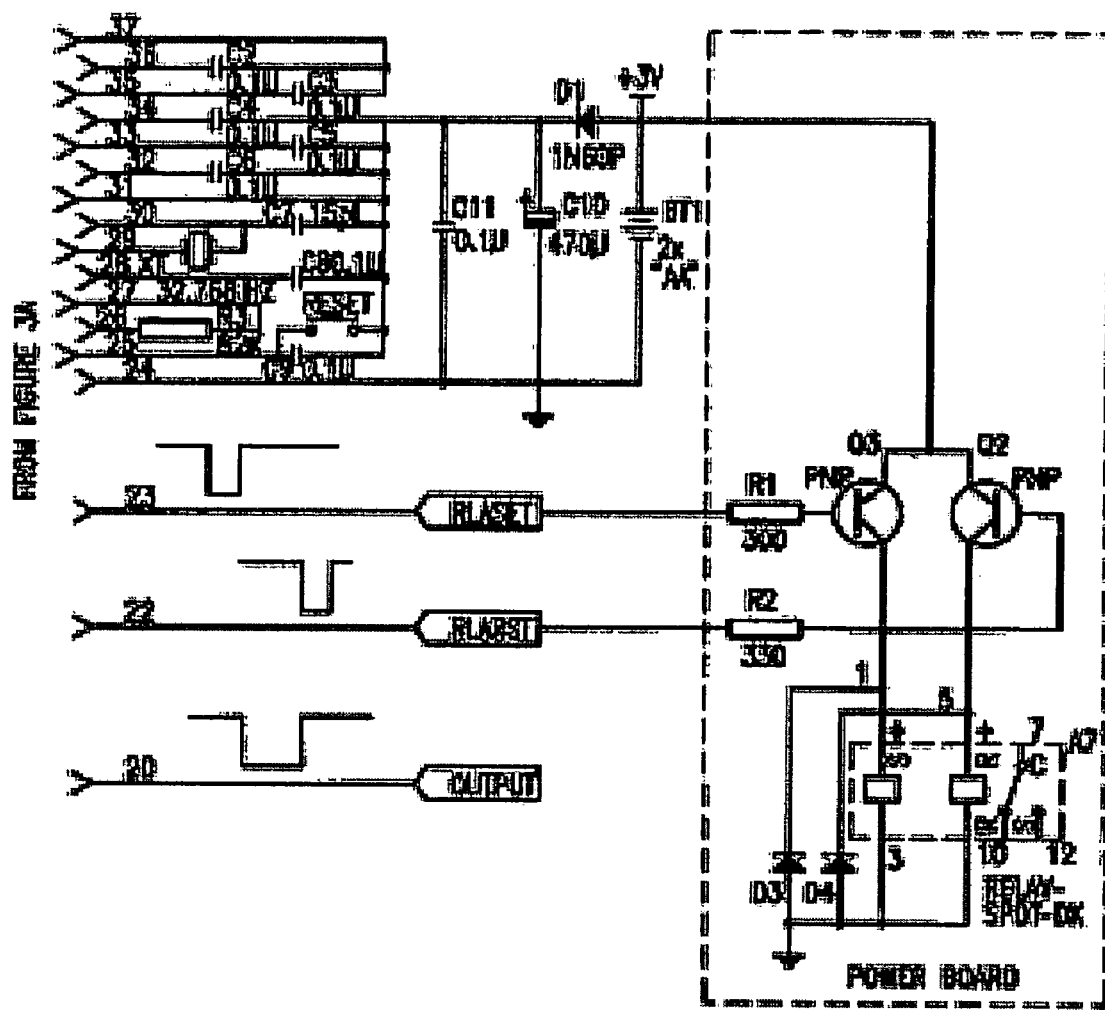

A schematic of an embodiment of a controller 105 of the invention for use with the aforementioned temperature control, fan control, and filter usage counter is illustrated in FIGS. 4(a)–(b). As shown in FIGS. 4(a)–(b), a microprocessor may be powered by a DC power board, and, in turn, power an LCD display. The microprocessor may have a plurality of outputs to individual segments on the LCD display for outputting information thereto to be viewed by the user. The microprocessor may also include the plurality of inputs/outputs to a temperature modifying device and to a series of switches (e.g., next, hold, down, and up). One of these switches SW2, may be selectable in this example, between a weekday program, a weekend program, date and time selection, setting the fan control information, setting the filter control information, and running or operating the thermostat. By selecting one of these positions in SW2, the user may designate which aspect of the programming (e.g., temperature control, fan control, filter usage, etc.) setting may be inputted into the microprocessor using the remaining switches. Of course, those of ordinary skill in the art will appreciate that this is only one possible embodiment of the invention and is not limited thereto.

In order to set the filter usage period in controller 105, the user may rotate dial 212 (or whatever equivalent mechanism is being used) to the SET AIR FILTER position. Programmable device 104 of controller 105 is now in the air filter setting mode of its programming.

Figure 5A:
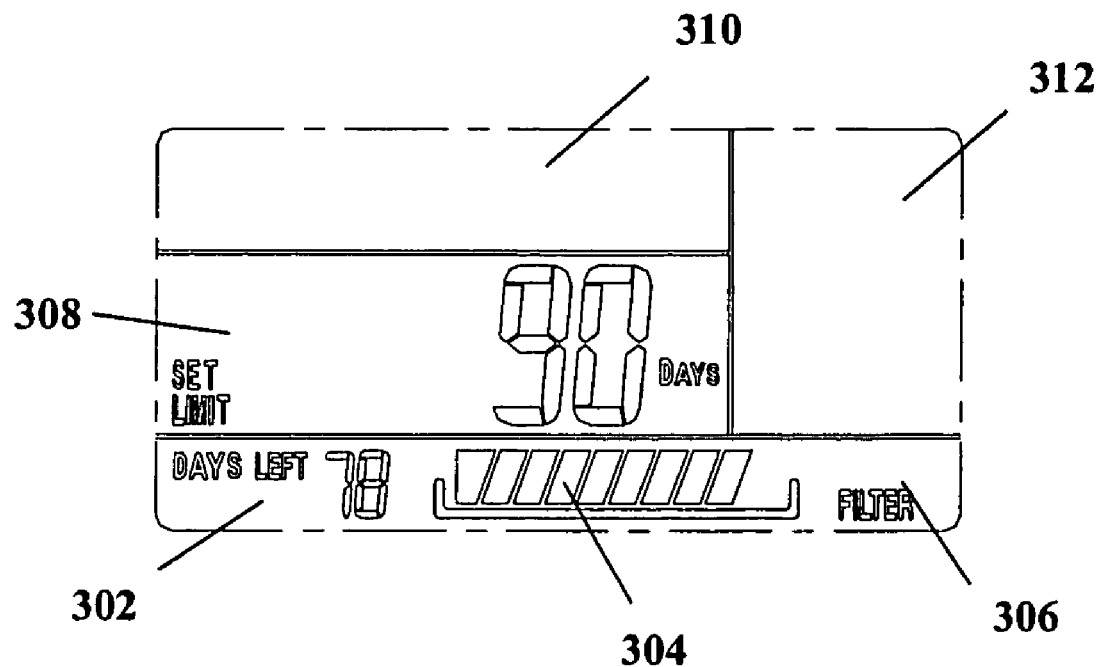
FIGS. 5(a)–(b) are illustrations of a programmable thermostat display for setting a filter usage counter.
Figure 5B:
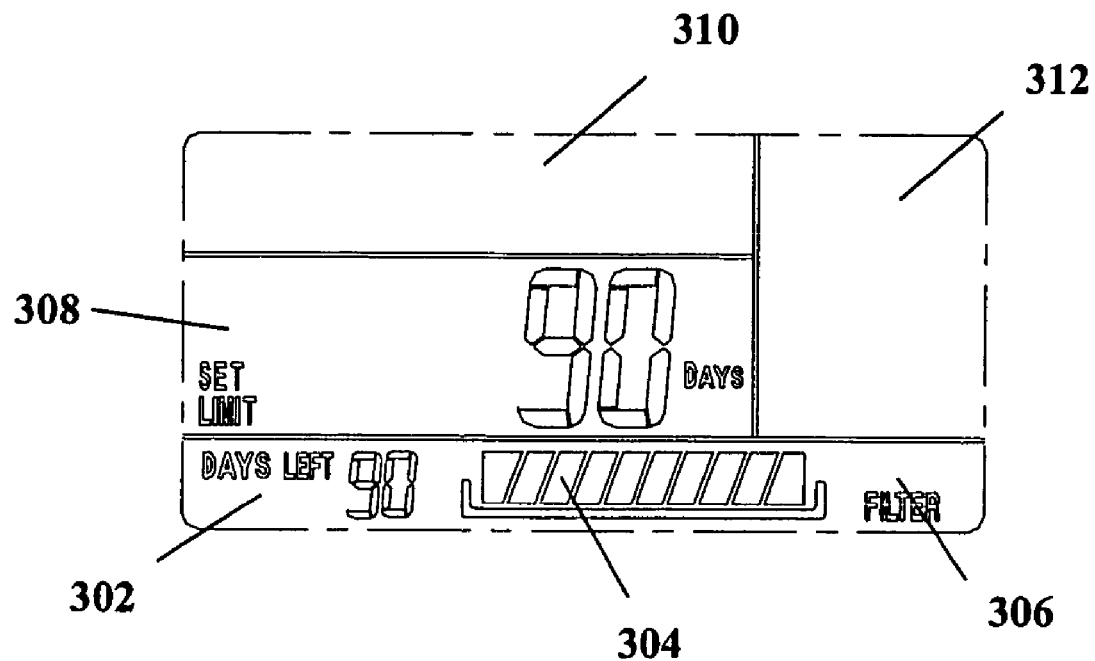

Display 106 may show the information indicated in FIG. 5(*a*), although the invention is not limited to this example. As shown in FIG. 5(*a*), indicator 306 may show that the thermostat is now in filter setting mode. The current time/temperature portion of the display may now be replaced with a SET LIMIT display 308 that indicates with the current FILTER USAGE LIMIT in days. The percentage of filter life remaining may be shown in bar indicator 304 and the number of days left shown at numerical indicator 302. PROGRAM section 310 and TEMP section 312 may be set blank in this mode to minimize any confusion of the user.

In this example, the default usage value is 90 days, but the invention is not limited thereto. The user may press and release [UP] or [DOWN] buttons 213 to scroll through a pre-set selection of choices. These selections may be displayed on numerical indicator 302 and SET LIMIT display 308, for example. Selecting a usage period may also reset bar indicator 304 to show 0% used.

Standard pre-set choices may include, for example, 0, 30, 60, 90, and 120 days, although the invention is not limited thereto. Of course, the programming of controller 105 may allow for the user to select a custom usage period as well (e.g., 45 days), such as by depressing and holding a combination of button to incremented the usage counter to the desired number of days. Setting the filter usage limit to 0 days may be used to disable the filter usage counter.

The system of the invention may also be programmed to determine the filter usage time using a predetermined usage formula. In this embodiment for example, the user may enter the rating of the filter (such as determined by the American Society of Healthcare Engineering, or ASHE). This rating is usually given in days or months. The system may then calculate the filter usage time (e.g., in days or fan running time) using a formula such the following:

$$\text{Filter Usage} = \frac{\text{Filter rating (days)} \times 24 \text{ hrs} \times (\text{Fan Daily Run Time (hrs)}/24 \text{ hrs})}{100}$$

Dividing by 100 allows a rounded number to be used. In this example, the fan run time may be as programmed by the user, or may be a default estimated run time (e.g., 20 minutes per hour). The system may also be programmed to determine the rating of the filter from the filter model number, such as by using a look-up table of model information or determining the rating directly from the model number itself. The usage meter may also thus reflect the filter usage in a user selected number of days, as discussed above, or based upon the programmed or estimated running time of the fan.

The user may also reset the counter to its default value or to restore a previous count using a combination of buttons 213. Those of ordinary skill in the art will appreciate that the invention is not particularly limited in this manner. Once the user is finished setting the usage counter, he or she may then switch the thermostat to another mode, such as RUN mode for operation, or one of the time or temperature setting modes.

Figure 6:
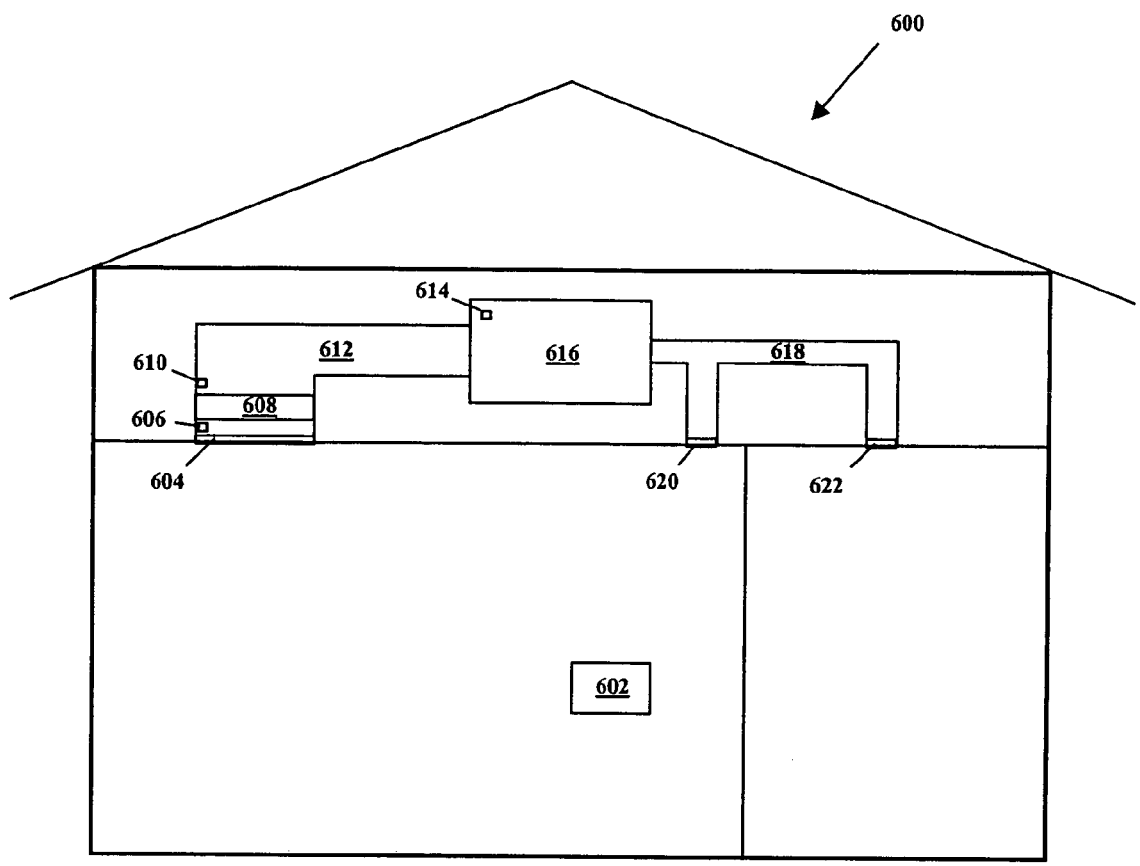
FIG. 6 is an illustration of an air handling system of an environmental control system in accordance with aspects of the invention.

The filter usage may also be programmed based upon a direct or indirect measurement of the actual use of the filter. This may be further explained in connection with FIG. 6, which illustrates one sample embodiment of an air handling portion of an environmental control system. Those of ordinary skill in the art will appreciate that this example is for purposes of illustration only and that the system of the invention may be used with any temperature control system or configuration.

In this example, environmental control system 600 may include thermostat 602, which is used to detect and control the temperature in one or more rooms throughout the structure. Air is circulated around the system by blower (fan) 616. Thermostat 602 and fan 616 may also be in communication with one or more heating/cooling apparatus, as is well known to those of ordinary skill in the art.

Fan 616 circulates air through supply duct 618, which is vented into each room through one or more registers 620, 622. In the embodiment shown, air is circulated back to fan 616 using a common return 604. The returning air passes through an a filter 608 and return duct 612 back to fan 616.

One or more sensors 606, 610, and/or 614 may be used to sense various characteristics of the system. For example, sensors 610 and 606 may be used to measure changes in air pressure on either side of air filter 608. In such an embodiment, the system of the invention may be programmed to sample an actual pressure differential when a filter is first changed or installed. Alternatively, a single sensor 610 may be used with its value compared against standard air pressure. In this embodiment sensors 606 and/or 610 may comprise any sensing element capable of detecting changes in air pressure, such as diaphragms and the like.

Information from the sensors may be communicated back to thermostat 602, where programming device 104 (FIG. 1) may use this information to determine the usage time left for the filter for display 106 (FIG. 1). For example, programming device 104 may include a formula for estimating the usage life of a filter based upon changes to air pressure on the downstream side of the filter due to the buildup of particulates in the filter, in a manner similar to the formula discussed above. The usage period may change based upon the rating or model of the filter (as may be inputted by the user). Alternatively, the sensor may incorporate a go/no-go switch or other mechanism that determines the usage period left and communicates this information back to the thermostat. The sensor may also contain a reset switch for resetting the characteristic information for the air circulating system back to a default value, such as when the filter is changed.

In another embodiment, sensors 606 and/or 610 may measure airflow in the system and programming device 104 (FIG. 1) may calculate the filter usage from the airflow measurements. As with the air pressure calculation, a formula may be used to determine the usage period of the filter. Also as with the air pressure sensor, any sensor capable of measuring air flow may be used. For example, the air flow sensor may comprise mechanical sensors (e.g., "pin wheel" type sensors) or electronic heat loss sensing elements. The invention is not limited.

In yet another embodiment, the filter usage may be measured indirectly as well, such as by measuring the fan usage. This may be accomplished, for example, by incorporating sensor 614 to sense the operation of fan 616 and communicating this information back to thermostat 602. For example, sensor 614 may sense the current draw and/or power usage of fan 616. This may be accomplished using any number of well known current/power sensors. Programming device 104 (FIG. 1) may use the information received from sensor 614, along with the fan programming information and filter rating/model information, to calculate the usage period of the filter using a formula similar to the one discussed above.

While the invention as disclosed herein has been described in relation to specific embodiments thereof, it is understood that the invention is not limited to the particular embodiment disclosed herein, but only as set forth in the appended claims. It will be appreciated that various components known to those of skill in the art may be substituted for those described herein without departing from the spirit and scope of the invention as set forth in the appended claims. For example, the input device may include a pressure keypad or a series of contact switches instead of the pressure switches disclosed herein. The display device may also include an LED display or other illuminated display mechanisms, or any of a number of conventional mechanical display mechanisms such as gauges or the like. The invention may be used in connection with any device that controls temperature.

What is claimed is:

1. A programmable temperature control apparatus for the control of temperature in communication with a temperature-modifying device and an HVAC air circulating system, said programmable temperature control apparatus comprising:
    a user-operable input connected for entering user selected air filter information associated with an air filter in said HVAC air circulating system;
    a controller programmed to control a thermal output of said temperature-modifying device to achieve a desired temperature, and to generate air filter output information based upon said air filter information inputted at said user-operable input; and
    a display for displaying said air filter output information during said control of said thermal output of said temperature-modifying device.

2. The apparatus of claim 1, wherein said air filter information comprises a usage period that is one or more selected from the group consisting of 0 days, 30 days, 60 days, 90 days, and 120 days.

3. The apparatus of claim 1, wherein said air filter output information comprises one or more selected from the group consisting of how much time remains in said air filter usage period, what percentage of said air filter usage period remains, and whether said air filter should be checked.

4. The apparatus of claim 2, wherein said time is represented in days.

5. The apparatus of claim 2, wherein said percentage is represented using a bar indicator.

6. The apparatus of claim 1, wherein said air filtration output information is calculated using a formula based upon an air filter information and operation of said air circulating system.

7. The apparatus of claim 1, further comprising at least one sensor for sensing at least one characteristic of said air circulating system and communicating characteristic information based thereon to said controller; and wherein said controller is further programmed to generate said air filtration output information using said characteristic information.

8. The apparatus of claim 7, wherein said characteristic of said air circulating system comprises one or more selected from the group consisting of air pressure, air flow, air heat loss, fan usage, fan current draw, and fan power usage.

9. The apparatus of claim 7, wherein said sensor includes a reset button for resetting said characteristic information.

10. The apparatus of claim 7, wherein said sensor is located proximate said filter.

11. The apparatus of claim 7, wherein said sensor communicates with said controller using one or more selected from the group consisting of radio frequency communication, infrared communication, low voltage cabling, and household power lines.

12. The apparatus of claim 7, wherein said sensor is configured to determine at least a portion of said air filtration output information from said characteristic of said air circulating system.

13. A programmable temperature control apparatus for the control of temperature in communication with a temperature-modifying device and an HVAC air circulating system, said programmable temperature control apparatus comprising:
    a user-operable input connected for entering user selected air filter information associated with an air filter in said HVAC air circulating system;
    a controller programmed to control a thermal output of said temperature-modifying device to achieve a desired temperature, and to generate air filter output information based upon said air filter information inputted at said user-operable input;
    a display for displaying said air filter output information during said control of said thermal output of said temperature-modifying device; and
    at least one sensor for sensing at least one characteristic of said air circulating system and communicating characteristic information based thereon to said controller to be used in generating said air filtration output information.

14. The apparatus of claim 13, wherein said air filter information comprises a usage period that is one or more selected from the group consisting of 0 days, 30 days, 60 days, 90 days, and 120 days.

15. The apparatus of claim 13, wherein said air filter output information comprises one or more selected from the group consisting of how much time remains in said air filter usage period, what percentage of said air filter usage period remains, and whether said air filter should be checked.

16. The apparatus of claim 15, wherein said time is represented in days.

17. The apparatus of claim 15, wherein said percentage is represented using a bar indicator.

18. The apparatus of claim 13, wherein said air filtration output information is calculated using a formula based upon said air filter information and operation of said air circulating system.

19. The apparatus of claim 13, wherein said characteristic of said air circulating system comprises one or more selected from the group consisting of air pressure, air flow, air heat loss, fan usage, fan current draw, and fan power usage.

20. The apparatus of claim 13, wherein said sensor includes a reset button for resetting said characteristic information.

21. The apparatus of claim 13, wherein said sensors is located proximate said filter.

22. The apparatus of claim 13, wherein said sensor communicates with said controller using one or more selected from the group consisting of radio frequency communication, infrared communication, low voltage cabling, and household power lines.

23. The apparatus of claim 13, wherein said sensor is configured to determine at least a portion of said air filtration output information from said characteristic of said air circulating system.

24. A method of monitoring an air filter used in connection with a programmable temperature control system and an HVAC system, said method comprising the steps of:
  entering user selected air filter information to a controller programmable to control a thermal output of a temperature-modifying device to achieve a desired temperature;
  generating air filtration output information using said air filter information; and
  displaying said air filtration output information on a display during said control of said thermal output of said temperature-modifying device.

25. A method of monitoring an air filter used in connection with a programmable temperature control system and an HVAC system, said method comprising the steps of:
  entering user selected air filter information to a controller programmable to control a thermal output of a temperature-modifying device to achieve a desired temperature;
  receiving characteristic information regarding at least one characteristic of said air circulating system;
  generating air filtration output information using said air filter information and said characteristic information; and
  displaying said air filtration output information on a display during said control of said thermal output of said temperature-modifying device.

26. A temperature control apparatus for the control of temperature in communication with a temperature-modifying device and an HVAC air circulating system, said temperature control apparatus comprising:
  a user-operable input connected for entering user selected air filter information associated with an air filter in said HVAC air circulating system;
  an electronic controller to control a thermal output of said temperature-modifying device to achieve a desired temperature, and to generate air filter output information based upon said air filter information inputted at said user-operable input; and
  a display for displaying said air filter output information during said control of said thermal output of said temperature-modifying device.

27. The apparatus of claim 26, wherein said air filter information comprises a usage period that is one or more selected from the group consisting of 0 days, 30 days, 60 days, 90 days, and 120 days.

28. The apparatus of claim 26, wherein said air filter output information comprises one or more selected from the group consisting of how much time remains in said air filter usage period, what percentage of said air filter usage period remains, and whether said air filter should be checked.

29. The apparatus of claim 26, wherein said user-operable input is connected for entering air handling information to program said air circulating system to operate at predetermined intervals.

30. The apparatus of claim 29, wherein said air handling information comprises one or more selected from the group consisting of operating periods and ON time during said operating periods set between 9 and 60 minutes.

31. The apparatus of claim 26, wherein said air filtration output information is calculated using a formula based upon a air filter information and operation of said air circulating system.

32. The apparatus of claim 26, further comprising at least one sensor for sensing at least one characteristic of said air circulating system and communicating characteristic information based thereon to said controller; and wherein said controller is further programmed to generate said air filtration output information using said characteristic information.

33. A temperature control apparatus for the control of temperature in communication with a temperature-modifying device and an HVAC air circulating system, said temperature control apparatus comprising:
  a user-operable input connected for entering user selected air filter information associated with an air filter in said HVAC air circulating system;
  an electronic controller to control a thermal output of said temperature-modifying device to achieve a desired temperature, and to generate air filter output information based upon said air filter information inputted at said user-operable input;
  a display for displaying said air filter output information during said control of said thermal output of said temperature-modifying device; and
  at least one sensor for sensing at least one characteristic of said air circulating system and communicating characteristic information based thereon to said controller to be used in generating said air filtration output information.

34. The apparatus of claim 33, wherein said air filter information comprises a usage period that is one or more selected from the group consisting of 0 days, 30 days, 60 days, 90 days, and 120 days.

35. The apparatus of claim 33, wherein said air filter output information comprises one or more selected from the group consisting of bow much time remains in said air filter usage period, what percentage of said air filter usage period remains, and whether said air filter should be checked.

36. The apparatus of claim 33, wherein said user-operable input is connected for entering air handling information to program said air circulating system to operate at predetermined intervals.

37. A method of monitoring an air filter used in a temperature control system of an HVAC air circulating system, said method comprising the steps of:
  entering user selected air filter information to a controller to control a thermal output of a temperature-modifying device in the HVAC system to achieve a desired temperature;
  generating air filtration output information using said air filter information; and
  displaying said air filtration output information on a display during said control of said thermal output of said temperature-modifying device.

38. A method of monitoring an air filter used in a temperature control system of an HVAC air circulating system, said method comprising the steps of:
  entering user selected air filter information to a controller to control a thermal output of a temperature-modifying device in the HVAC system to achieve a desired temperature;
  receiving characteristic information regarding at least one characteristic of said air circulating system;
  generating air filtration output information using said air filter information and said characteristic information; and
  displaying said air filtration output information on a display during said control of said thermal output of said temperature-modifying device.

39. A programmable temperature control apparatus for the control of temperature in communication with a temperature-modifying device and an air circulating system, said programmable temperature control apparatus comprising:

a user-operable input connected for entering air filter information;

a controller programmed to control a thermal output of said temperature-modifying device to achieve a desired temperature, and to generate air filter output information based upon said air filter information inputted at said user-operable input; and a display for displaying said air filter output information during said control of said thermal output of said temperature-modifying device, wherein said user-operable input is connected for entering air handling information to program said air circulating system to operate at predetermined intervals.

40. The apparatus of claim 39, wherein said air handling information comprises one or more selected from the group consisting of operating periods and ON time during said operating periods.

41. The apparatus of claim 40, wherein said ON time may be set between 9 and 60 minutes.

42. The apparatus of claim 41, wherein said ON time maybe set in increments of 3 minutes.

43. A programmable temperature control apparatus for the control of temperature in communication with a temperature-modifying device and an air circulating system, said programmable temperature control apparatus comprising:

a user-operable input connected for entering air filter information;

a controller programmed to control a thermal output of said temperature-modifying device to achieve a desired temperature, and to generate air filter output information based upon said air filter information inputted at said user-operable input;

a display for displaying said air filter output information during said control of said thermal output of said temperature-modifying device; and at least one sensor for sensing at least one characteristic of said air circulating system and communicating characteristic information based thereon to said controller to be used in generating said air filtration output information, wherein said user-operable input is connected for entering air handling information to program said air circulating system to operate at predetermined intervals.

44. The apparatus of claim 43, wherein said air handling information comprises one or more selected from the group consisting of operating periods and ON time during said operating periods.

45. The apparatus of claim 44, wherein said ON time may be set between 9 and 60 minutes.

46. The apparatus of claim 45, wherein said ON time may be set in increments of 3 minutes.

* * * * *